United States Patent
Parulski

(10) Patent No.: US 6,909,463 B2
(45) Date of Patent: Jun. 21, 2005

(54) CAMERA HAVING VERIFICATION DISPLAY AND WHITE-COMPENSATOR AND IMAGING METHOD

(75) Inventor: Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 705 days.

(21) Appl. No.: 09/748,668

(22) Filed: Dec. 22, 2000

(65) Prior Publication Data

US 2002/0080254 A1 Jun. 27, 2002

(51) Int. Cl.[7] ........................ H04N 5/222; H04N 5/335; H04N 5/73

(52) U.S. Cl. .............................. 348/333.01; 348/223.1; 348/656; 348/657; 348/658; 345/589; 345/590; 349/61; 349/63; 349/64; 349/65; 349/68; 349/69; 349/70; 396/374

(58) Field of Search ........................ 348/333.01, 223.1, 348/656, 657, 658; 345/589, 590; 349/61, 64, 65, 63, 68, 69, 70; 396/374

(56) References Cited

U.S. PATENT DOCUMENTS

| | | | |
|---|---|---|---|
| 3,572,943 A | 3/1971 | Corley | |
| 3,674,364 A | 7/1972 | Korman | |
| 4,500,919 A | * 2/1985 | Schreiber | ..................... 358/518 |
| 4,779,974 A | 10/1988 | Bahnemann et al. | |
| 4,887,121 A | * 12/1989 | Pritchard | ..................... 396/225 |
| 4,945,406 A | 7/1990 | Cok | |
| 5,099,268 A | 3/1992 | O'Such et al. | |
| 5,119,178 A | 6/1992 | Sakata et al. | |
| 5,121,155 A | 6/1992 | O'Such et al. | |
| 5,132,825 A | 7/1992 | Miyadera | |
| 5,276,779 A | 1/1994 | Statt | |
| 5,389,984 A | 2/1995 | Lovenheim | |
| 5,420,979 A | 5/1995 | Madden et al. | |
| 5,452,049 A | 9/1995 | Takagi | |
| 5,515,104 A | 5/1996 | Okada | |
| 5,609,978 A | 3/1997 | Giorgianni et al. | |
| 5,668,596 A | 9/1997 | Vogel | |
| 5,682,562 A | 10/1997 | Mizukoshi et al. | |
| 5,710,954 A | * 1/1998 | Inoue | ......................... 396/374 |
| 5,732,293 A | 3/1998 | Nonaka et al. | |
| 5,754,222 A | 5/1998 | Daly et al. | |
| 5,786,823 A | 7/1998 | Madden et al. | |
| 5,805,213 A | 9/1998 | Spaulding et al. | |
| 5,892,991 A | 4/1999 | Hamada et al. | |
| 5,986,297 A | 11/1999 | Guidash et al. | |
| 6,009,281 A | 12/1999 | Hosomizu et al. | |
| 6,009,282 A | 12/1999 | Ishiguro et al. | |
| 6,323,999 B1 | * 11/2001 | Ueda et al. | ................. 359/443 |

* cited by examiner

Primary Examiner—Wendy R. Garber
Assistant Examiner—James M. Hannett
(74) Attorney, Agent, or Firm—Robert L. Walker

(57) ABSTRACT

In a camera and method, a white-compensator propagates neutral light at a preset color temperature independent of a displayed electronic image. The camera has a body and an electronic imager disposed in the body. The imager generates an electronic image responsive to an incident light image. A display is disposed on the outside of the body. The display is operatively connected to the imager. The white-compensator neighbors the display.

17 Claims, 10 Drawing Sheets

CAMERA HAVING VERIFICATION DISPLAY AND WHITE-COMPENSATOR AND IMAGING METHOD

CROSS REFERENCE TO RELATED APPLICATIONS

Reference is made to commonly assigned co-pending U.S. patent applications Ser. No. 09/748,620, entitled: HYBRID CAMERA FILL-FLASH, and filed 22 Dec. 2000 in the names of Hirohiko Ina and Hisanori Hoshikawa; Ser. No. 09/747,714, entitled: COLOR CORRECTING FLASH APPARATUS, CAMERA, AND METHOD, and filed 22 Dec. 2000 in the name of David L. Funston; Ser. No. 09/747,680, entitled: CAMERA HAVING VERIFICATION DISPLAY WITH VIEWER ADAPTATION COMPENSATION FOR REFERENCE ILLUMINANTS AND METHOD, and filed 22 Dec. 2000 in the names of David L. Funston and Kenneth A. Parulski; Ser. No. 09/748,100, entitled: CAMERA HAVING USER INTERFACE WITH VERIFICATION DISPLAY AND COLOR CAST INDICATOR, and filed 22 Dec. 2000 in the names of David L. Funston, Kenneth A. Parulski, and Robert Luke Walker; Ser. No. 09/748,667, entitled: CAMERA HAVING VERIFICATION DISPLAY WITH REVERSE WHITE BALANCED VIEWER ADAPTATION COMPENSATION AND METHOD, and filed 22 Dec. 2000 in the names of Kenneth A. Parulski and David L. Funston; Ser. No. 09/748,664, entitled: CAMERA HAVING USER INTERFACE AMBIENT SENSOR VIEWER ADAPTATION COMPENSATION AND METHOD, and filed 22 Dec. 2000 in the name of Kenneth A. Parulski; Ser. No. 09/747,557, entitled: CAMERA THAT DISPLAYS PREDOMINANT COLOR OF MULTI-COLOR SCENE AND/OR MULTI-COLOR CAPTURED IMAGE OF SCENE, and filed 22 Dec. 2000 in the name of Roger A. Fields, and Ser. No. 08/970,327, entitled: AUTOMATIC LUMINANCE AND CONTRAST ADJUSTMENT FOR DISPLAY DEVICE, and filed 14 Nov. 1997, in the names of James R. Niederbaumer and Michael Eugene Miller.

FIELD OF THE INVENTION

The invention relates to photography and more particularly relates to a camera having a verification display and a white compensator and related imaging method.

BACKGROUND OF THE INVENTION

Some hybrid film capture-electronic capture cameras capture an electronic image when a film image is captured and show the electronic image on a display as a verification image that indicates what was captured in the film image. It is desirable that the verification image present enough information for the user to decide whether to take corrective action, such as making another exposure of the same subject, under different conditions, to replace the earlier exposure.

The color balance of captured images is of particular interest to a photographer using a camera that provides a verification image, since many color balance problems can be readily corrected in a second exposure under different lighting conditions, such as flash illumination or outdoors. The color balance of latent photographic images depends on the spectral power distribution, that is, the color temperature, of the scene illuminant. The term "color temperature" and like terms are used herein in a sense that encompasses both actual color temperatures and correlated color temperatures. The definition of "correlated color temperature" in *The Focal Encyclopedia of Photography*, 3rd ed., Stroebel, L. and Zakia, R., ed., Focal Press, Boston, 1993, page 175, states:

"CORRELATED COLOR TEMPERATURE A value assigned to a light source that does not approximate a black body source and therefore does not possess a color temperature. The correlated color temperature is the color temperature of the blackbody source that most closely approximates the color quality of the source in question. Correlated color temperatures are determined by illuminating selected color samples with the source in question and then determining the color temperature of the blackbody source that results in the color samples appearing the most similar to a standard observer."

The color balance of latent photographic images also depends on the type of film used. A film of a given type is formulated to provide a neutral response to a particular designated illuminant. A neutral response matches the spectral power distribution of the designated illuminant. For example, "daylight" film directly exposed by daylight records equal printing densities for each of the cyan, yellow, and magenta film records. A resulting photographic print, photofinished so as to maintain the neutral response, will be properly color balanced with white objects in the scene appearing as white objects in the printed image.

If a film of a given type is exposed using an illuminant that has a different color balance than the designated illuminant for that film type, then the resulting final images will have a color cast, that is, a non-neutral response in the form of a color balance shift that causes white objects in the scene to appear colored. For example, a color cast in a photographic print means that white objects in the scene are reproduced at a noticeably different correlated color temperature than that of a "white" illuminant used to illuminate the print. The color cast can be described in terms of the perceived color that replaces white. With daylight film, fluorescent exposures printed neutrally (that is, with the same printed balance as used for daylight exposures) result in images having a greenish color cast when viewed in daylight; tungsten exposures have a reddish-orange color cast.

The color balance of a final photographic image produced by photofinishing also depends upon the scene balance algorithm used to control the photographic printer or other photofinishing equipment used. Many commercially available photofinishing systems attempt to determine the color balance of photographic images before printing to allow compensation for a color cast caused by fluorescent (and tungsten) illumination. The compensation is typically only partial, because partial compensation does not unacceptably degrade highly-colored images (for example, images of bright yellow objects under daylight illumination) that are erroneously judged as having a different illuminant and selected for color compensation. A noticeable color cast is still perceived in the final images, after the partial compensation. Stating this another way, after partial compensation, white objects in the scene shown in final photofinished images are perceived as being non-white in color. This color cast can provide an artistic effect, but in most cases, the remaining color cast is objectionable to the user.

In some digital still and video cameras, this problem with color cast is not present, since the final image is produced from a saved image data set that has been subjected to white balancing. Such images have a neutral color balance when output to an appropriately configured output device. Methods for calibrating to particular devices and media are well known. Many white balancing procedures are known. For example, one method of white balancing is described in U.S.

Pat. No. 5,659,357, "Auto white adjusting device", to Miyano. The result of this process is that the red (R) and blue (B) code values of the digital images captured using various illuminants are scaled by appropriate white balance correction parameters. These parameters are determined such that the white balance corrected R and B codes are approximately equal to the green (G) codes for white and neutral gray objects of the scene.

The human visual system, under common lighting conditions, adapts to illuminants having different color temperatures, in a manner that is similar to the white balancing just discussed. (The terms "visual adaptation" and "adaptation" are used herein in the sense of chromatic adaptation. Brightness adaptation is only included to the extent that brightness effects influence chromatic adaptation.) The result is that daylight, fluorescent, tungsten, and some other illuminants, in isolation, are all perceived as white illumination. As noted above, photographic film does not function in the same manner as the human visual system; and after photofinishing, pictures photographed in some lighting conditions are perceived as having a color cast. The viewer perceives the pictures, as if through a colored filter.

A photographer using a hybrid film capture-electronic capture camera, is ordinarily adapted to the ambient illumination. Thus, if a verification image captured under fluorescent illumination is presented to the user without a change in the color balance, then the verification image will match the photographers visual adaptation. A white shirt will look white to the photographer, whether viewed directly or in the verification image. The problem with this approach is that what the photographer sees in the verification image does not look like what the photographer will see in the final printed image after photofinishing. White balancing the verification image would not help, since the film image will not be balanced the same way in photofinishing. The photographer is also still adapted to the ambient illumination.

U.S. patent application Ser. No. 08/970,327, filed by Miller, M. et al., entitled, "Automatic Luminance and Contrast Adjustment for Display Device", which is commonly assigned with this application; teaches a camera which measures the ambient light level and adjusts the brightness and contrast of an image display on the camera.

U.S. Pat. No. 5,132,825 discloses an apparatus that displays an image using internal or external illumination of a liquid crystal display (LCD). With internal illumination, the displayed image is balanced to provide neutral coloration using the internal light source. The image recorded at the same time is white balanced to daylight or another white balance standard. With external illumination, the displayed image is white-balanced in the same manner as the recorded image and is viewed using the same ambient illumination as the subject photographed. A shortcoming of this approach is that the external illumination cannot always be used and the device is complex and cumbersome.

Another approach is transforming the digital image. U.S. Pat. Nos. 5,132,825; 5,420,979; 5,515,104; 5,668,596; 5,710,954; 5,786,823 disclose the transformation of digital images to meet the spectral characteristics of a particular output device. U.S. Pat. Nos. 5,276,779 and 5,786,823 disclose systems that also transform digital images to compensate for user adaptation under specified viewing conditions. One shortcoming of these approaches is that viewing conditions must be known, before the digital image can be transformed.

Some color proofing systems have approached the problem of color matching by tailoring viewing conditions to provide the best color reproduction for a particular purpose. U.S. Pat. No. 4,500,919 teaches the use of a television monitor alongside a sheet of paper to be printed. The monitor and the paper are each surrounded by a lighted surround. The surrounds each have the same color temperature. The television surround has fluorescent tubes covered by diffusing material. The surround is slightly forward of the television tube and opaque material is positioned to shield the television tube from the light. U.S. Pat. No. 5,276,779 teaches a method in which color matching using a CRT and white surround takes into account viewer visual adaptation.

It would thus be desirable to provide a camera which displays a verification image along with white illumination for visual compensation and color comparison.

It would also be desirable to provide these features in a hybrid electronic-film camera.

SUMMARY OF THE INVENTION

The invention is defined by the claims. The invention, in its broader aspects, provides a camera and method, in which a white-compensator propagates neutral light at a preset color temperature independent of a displayed electronic image. The camera has a body and an electronic imager disposed in the body. The imager generates an electronic image responsive to an incident light image. A display is disposed on the outside of the body. The display is operatively connected to the imager. The white-compensator neighbors the display.

It is an advantageous effect of the invention that a camera is provided which displays a verification image along with white illumination for visual compensation. It is a further advantageous effect that these features are provided in a hybrid electronic-film camera.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
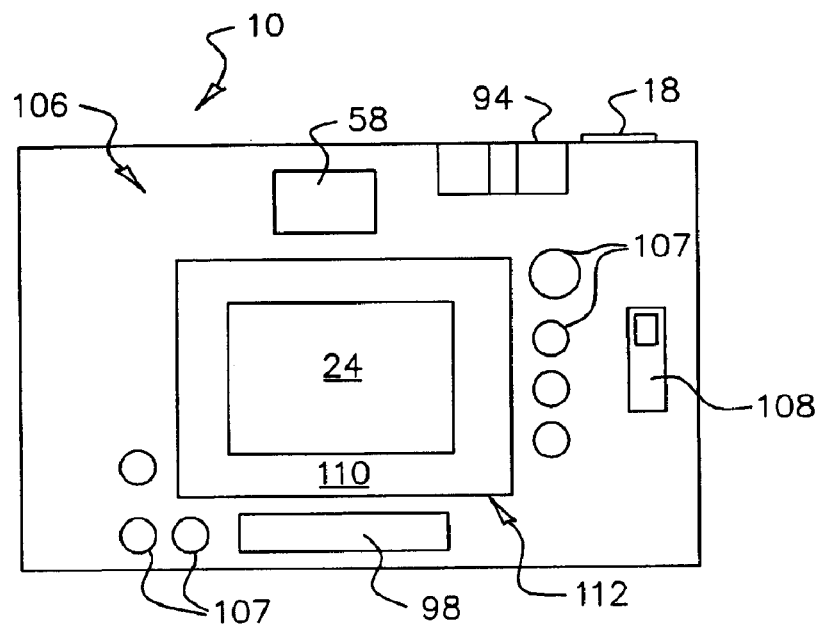
FIG. 1 is a rear view of an embodiment of the camera.

The camera 10 is used to capture a light image as an electronic image, in a camera, under ambient lighting having a color cast. An archival film image is also captured of the same scene, that is, the same light image. The electronic image is processed to provide a verification image that is then shown on a display mounted on the camera. The verification image shows the user what was captured in the archival image. The display image is propagated outward from a display mounted on the camera to the user. The user is still located in the ambient lighting in which the archival image was captured or, alternatively, the ambient lighting has changed in an unpredictable manner. The verification image has a color cast, but visual adaptation of the user to the same ambient lighting as the verification image, or similar unpredictable ambient lighting, would prevent the user from perceiving the color cast. The camera counteracts this visual adaptation of the user to ambient light by propagating white light in the vicinity of the displayed verification image using a white-compensator.

The white light has a preset first color temperature. The term "color temperature" used herein is inclusive of actual color temperatures for light sources having continuous spectral energy distributions and of correlated color temperatures for light sources having discontinuous spectral energy distributions. "Color temperature" is inclusive of correlated color temperatures resulting from pro rata contributions of multiple light sources. The term "neutral light" used herein refers to "normalized" light, that is, light that has chromaticity coordinates that match the spectral energy distribution of a particular source illuminant. With source illuminants that are suitable for color photography, neutral light is white in color to a viewer who is fully visually adapted to an individual source illuminant. This is a perceptual effect. Neutral light from one source illuminant differs from the neutral light produced by another source illuminant. For example, in the CIE, x, y chromaticity space, neutral light from a different source illuminants present different illuminant colors as seen by the CIE standard observer. The term "ambient lighting" refers to both scene illumination for a captured scene and the illumination present when a digital image is viewed in the image display.

The embodiments of the camera 10 generally discussed herein are electronic-film hybrids that present verifying digital images after latent film image capture, because such embodiments are particularly advantageous. It will be understood, however, that similar considerations apply to other hybrid cameras and to non-hybrid, digital cameras that capture archival images subject to a color cast due to "colored" light sources.

Referring now particularly to an embodiment shown in FIGS. 1 and 11–13, the camera 10 has a body 12 that holds a film latent image capture unit 14 and an electronic capture unit 16 (also referred to herein as a "verification image capture unit"). When the photographer trips a shutter release 18, a subject image (a light image of the scene) is captured on a frame of film 20 as a latent image and on an electronic array imager 22 of the electronic capture unit 16 as an electronic image. After digital processing of the electronic image, a verifying image is provided on a display 24 mounted to the camera body 12.

The body 12 of the camera 10 can be varied to meet requirements of a particular use and style considerations. It is convenient if the body 12 has front and rear covers 26,28 joined together over a chassis 30. Many of the components of the camera 10 can be mounted to the chassis 30. In the camera 10 shown in FIGS. 11–12, a film door 32 and a flip-up flash unit 34 are pivotally joined to the covers 26,28 and chassis 30.

The type of film unit 36 used is not critical. The embodiment shown in the drawings has an Advanced Photo System ("APS") film cartridge. This is not limiting. For example, other types of one or two chamber film cartridge, and roll film can also be used.

It is currently preferred that the cameras 10 are reloadable. The chassis 30 defines a film cartridge chamber 38, a film supply chamber 40, and an exposure frame 42 between the chambers 38,40. The filmstrip 44 is moved by a film transport 46 out of the canister 48 of the film cartridge 36, is wound onto a film roll 50 in the supply chamber 40, and is then returned to the canister 48. The film transport 46, as illustrated, includes an electric motor 46a located within a supply spool 46b, but other types of motorized transport mechanisms and manual transports can also be used. Latent image exposure can be on film advance or on rewind.

The electronic array imager 22 is mounted in the body 12 and is configured so as to capture the same scene as is captured in a contemporaneous latent image. It is currently preferred, to reduce overall costs and complexity of the camera 10; that the imager 22 has a low resolution relative to the latent film image. The type of imager used can vary, but it is highly preferred that the imager be one of the several types of solid-state imagers available. One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. A third type of sensor which can be used is a charge injection device (CID). These sensors differ from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Sharing can be accomplished by external shutter or, without an external shutter, by injecting the charge into the substrate for recombination.

The camera 10 has an optical system 50 (indicated by a dashed line in FIG. 13) that directs light to the exposure frame 42, to the electronic array imager 22, and, through an optical viewfinder, to the user. The imager 22 is spaced from the exposure frame 42, thus, the optical system 50 directs light along the first path 52 to the exposure frame 42 and along a second path 54 to the electronic array imager 22. Both paths 52,54 converge at a position in from the camera 10, at the plane of focus of the particular subject image. The optical system 50 has a beam splitter 53 that subdivides the second light path 54 between an imager subpath 54a to the imager 22 and a viewfinder subpath 54b that is redirected by a mirror 56 and transmitted through an eyepiece 58 to the photographer. The optical system 50 can be varied. For example (not shown), the viewfinder lens unit and an imager lens unit can be fully separate.

With a verifying camera, the verifying image does not have to have the same quality as the latent image captured on film. As a result the imager 22 and portion of the optical system 50 directing light to the imager 22 can be made smaller simpler and lighter. For example, a taking lens unit can be focusable and an imager lens unit can have a fixed focus. Alternatively, both the taking lens unit and the imager lens unit can be focusable, but the two lens units can focus over different ranges.

Figure 13:
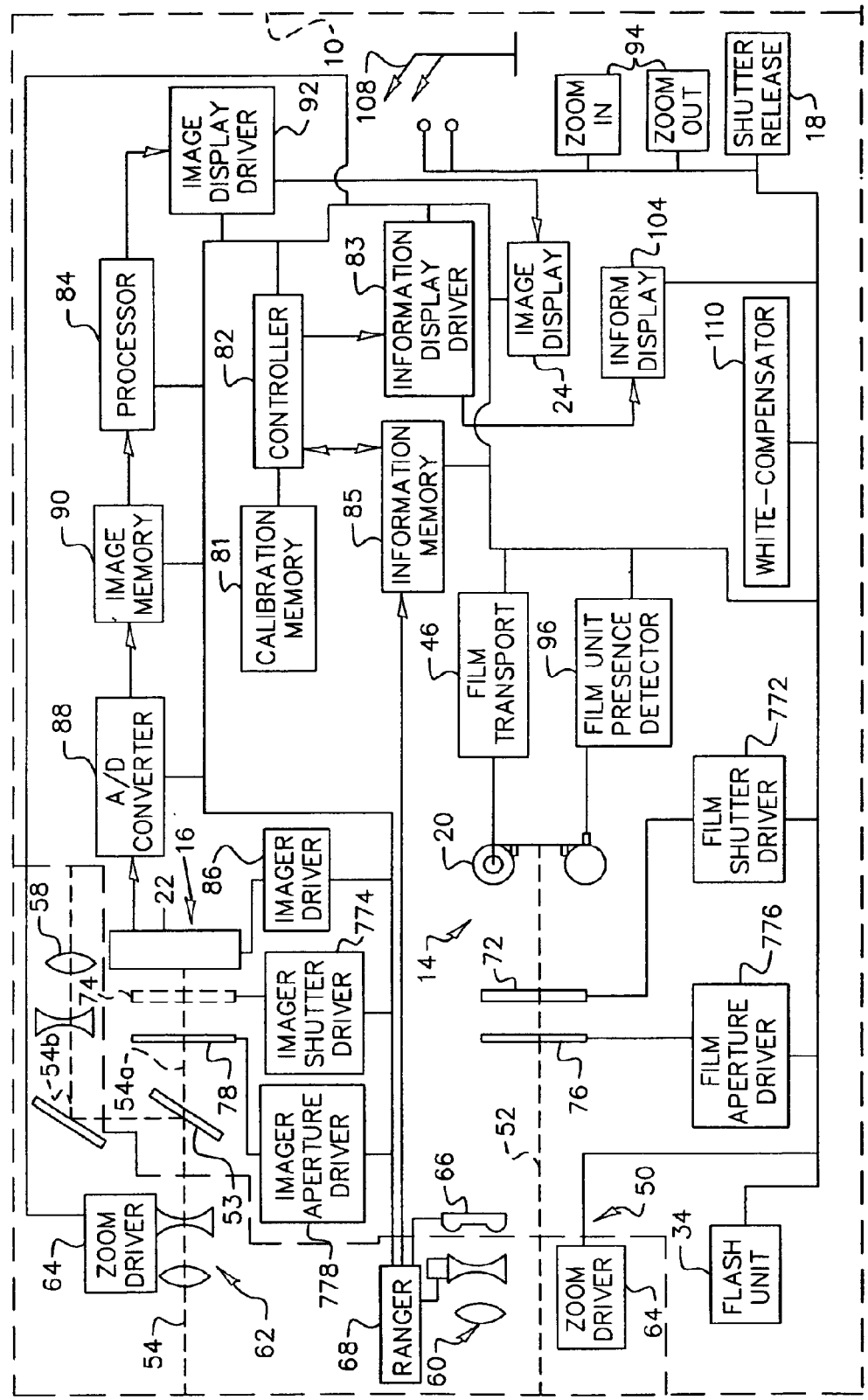
FIG. 13 is a simplified diagrammatical view of the cameras of FIGS. 11 and 12.

Referring now to the embodiment shown in FIG. 13, the taking lens 60 is a motorized zoom lens in which a mobile element or elements are driven by a zoom driver 64. A combined lens unit 62 also has a mobile element or elements driven by a zoom driver 64. The different zoom drivers 64 are coupled so as to zoom to the same extent, either mechanically (not shown) or by a controller 82 signaling the zoom drivers 64 to move the zoom elements of the two units 60,62 over the same range of focal lengths at the same time. The controller can take the form of an appropriately configured microcomputer, such as an embedded microprocessor having RAM for data manipulation and general program execution.

The taking lens unit 60 is also autofocusing. An autofocusing system has a sensor 66 that sends a signal to a ranger 68, which then operates a focus driver 70 to move one or more elements of the taking lens unit 60. The type of autofocusing system used is not critical. The autofocus can be passive or active or a combination of the two. The taking lens 60 can be simpler, such as having a single focal length or manual focusing or a fixed focus, but this is not preferred. The combined lens unit 62 in some of the embodiments, has a fixed focal length. The combination lens unit 62 or separate viewfinder and imager lens units can zoom instead and digital zooming can also be used instead of or in combination with optical zooming for the imager 22. The imager 22 and display 24 can be used as a viewfinder prior to image capture in place of or in combination with the optical viewfinder, as is commonly done with digital still cameras. This approach is not preferred, since battery usage is greatly increased.

A film shutter 72 shutters the first path 52. An imager shutter 74 shutters the second path 54. Diaphragms/aperture plates 76,78 can also be provided in the paths 52,54. Each of the shutters 72,74 is switchable between an open state and a closed state. Drivers 772,774,776,778 operate the shutters 72,74 and diaphragms/aperture plates 76,78, respectively.

The term "shutter" is used herein in a broad sense to refer to physical and/or logical elements that provide the function of allowing the passage of light along a light path to a filmstrip or imager for image capture and disallowing that passage at other times. "Shutter" is thus inclusive of mechanical and electromechanical shutters of all types. "Shutter" is not inclusive of film transports and like mechanisms that simply move film or an imager in and out of the light path. "Shutter" is inclusive of computer software and hardware features of electronic array imagers that allow an imaging operation to be started and stopped under control of the camera control system.

In currently preferred embodiments, the film shutter 72 is mechanical or electromechanical and the imager shutter 74 is mechanical or electronic. When using a CCD, the shuttering is accomplished by shifting the accumulated charge under a light shielded provides at a non-photosensitive region. This may be a full frame as in a frame transfer device CCD or a horizontal line in an interline transfer device CCD. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array. CMOS imagers are commonly shuttered by a method called a rolling shutter. This shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,986,297. In this method, called single frame capture mode, all pixels are allowed to integrate charge during exposure time. At the end of the exposure time, all pixels are simultaneously transferred to the floating diffusion of the device. At this point sequential read out by lines is possible.

A data bus 80 connects the imager 22, image display 24, a controller 82, an image processor 84, and other electronic components to the image display 24. The controller 82 facilitates the transfers of the image between the electronic components and provides other control functions, as necessary. The controller 82 includes a timing generation circuit that produces control signals for all electronic components in timing relationship. Calibration values for the individual camera are stored in a calibration memory 81, such as an EEPROM, and supplied to the controller 82. The controller 82 also operates an information display driver 83 and image display driver 82 and display memories 85, 90. The controller 82 also operates the zoom drivers, focus driver, film and imager aperture drivers, and film and imager shutter drivers. The controller connects to the flash unit 34, which mediates flash functions. It will be understood that the circuits shown and described can be modified in a variety of ways well known to those of skill in the art. It will also be understood that the various features described here in terms of physical circuits can be alternatively provided as firmware or software functions or a combination of the two. The controller 82 is illustrated as a single component, but it will be understood that this is a matter of convenience in illustration. The controller 82 can be provided as multiple components of equivalent function in distributed locations. The same considerations apply to the processor 84 and other components. Likewise, components illustrated as separate units herein may be conveniently combined or shared in some embodiments.

The imager 22 receives a light image (the subject image) and converts the light image to an analog electrical signal, the initial electronic image. The electronic imager 22 is driven by the imager driver 86. The initial electronic image is converted by an analog to digital (A/D) converter 88 to a digital electronic image, which is then processed and stored in memory 90. "Memory" refers to a suitably sized logical unit of physical memory provided in semiconductor memory or magnetic memory, or the like.

The electronic images are modified by the processor 84, as necessary for the requirements of a particular display 24, and output to the display 24. This calibrating can include conversion of the electronic image to accommodate differences in characteristics of the different components. For example, a transform can be provided that modifies each image to accommodate the different capabilities in terms of gray scale, color gamut, and white point of the display and imager and other components. The display 24 is driven by an image display driver 92 and produces a display image that is viewed by the user.

The electronic image can be further calibrated to match output characteristics of the selected photofinishing channel. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to designate photofinishing choices prior to usage. This designation could then direct the usage of particular photofinishing options. The application of a designation on a capture media unit could be provided by a number of means known to those in the art, such as application of a magnetic or optical code.

While the processor 84 does color balance the verification image to calibrate to the image display, the processor 84 does not, in addition, white-balanced the verification image. Such white balancing would eliminate color cast problems in the viewed image, but would also eliminate the usefulness of the verification image for showing the user an expected color cast in the archival image. Thus, when a picture is taken using the camera, in scene illumination having a color cast, the resulting verification image is color balanced to a neutral point that is different than the neutral light provided by the white-compensator 110. If the archival image storage media of the archival capture unit is balanced for a designated illuminant, such as daylight illumination with daylight type photographic film), then the color temperature of the verification image (the perceived neutral point of the scene) is less than the color temperature of the white-illuminator for common scene illuminants having a color cast, such as fluorescent and tungsten light fixtures.

Some photofinishing channels provide a reduction in color cast. If a selected photofinishing channel provides a reduction in color cast, then the verification image can be color balanced to show this effect. For such channels a color cast correction can be stored in the calibration memory of the camera. If the effect is a percentage reduction, such as an 80 percent reduction provided by some photofinishing channels, then the camera requires a scene illuminant sensor that can assess the color cast in the captured scene. The controller can then calculate an appropriate reduction in the color cast for the photofinishing channel and have that reduction applied by the processor.

Figure 16:
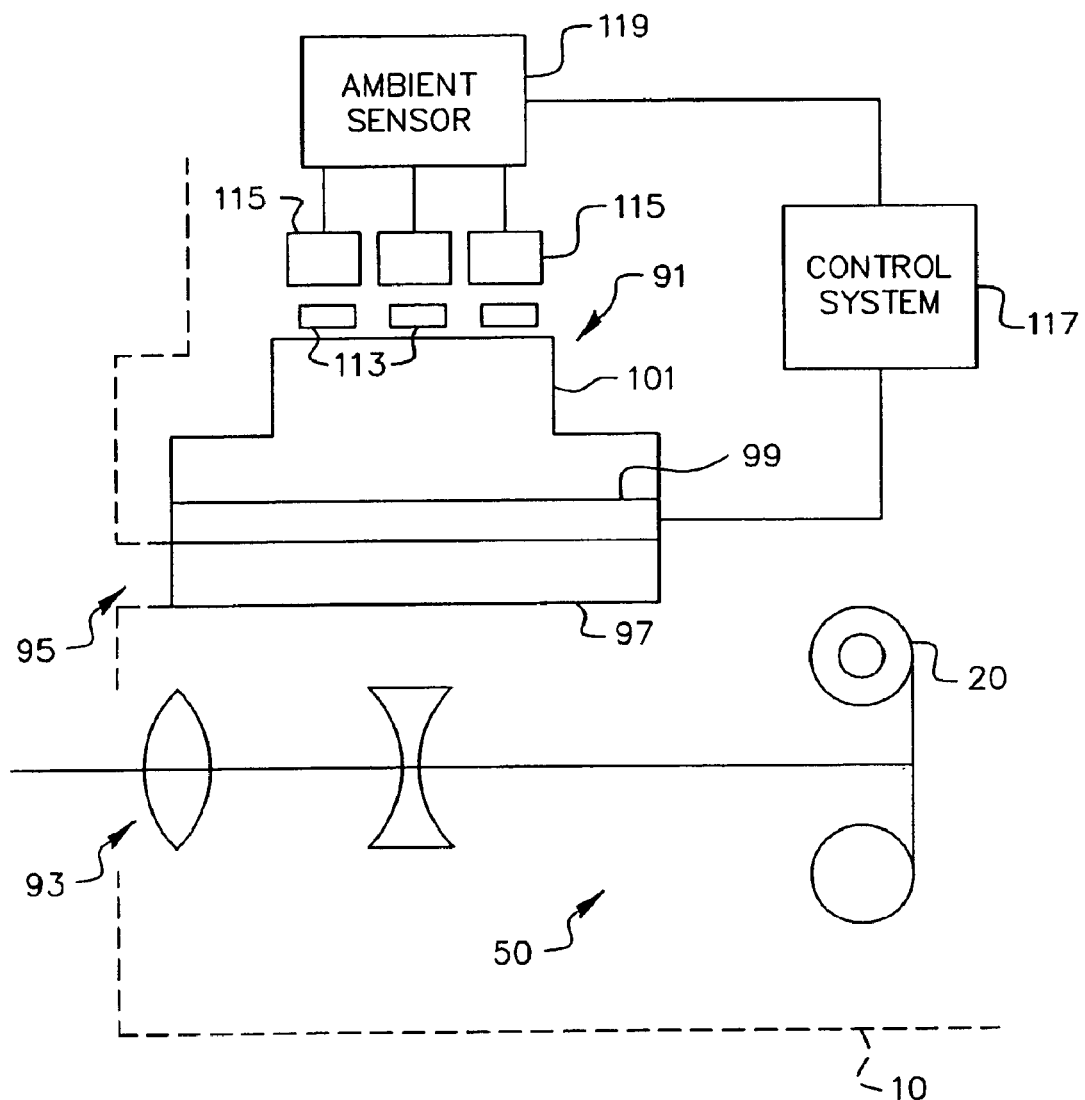
FIG. 16 is a partial diagrammatical view of a modification of the camera of FIG. 13.

An example, of a suitable ambient sensor that can be used to provide one or both of scene illumination and a measure of the scene illuminant color temperature, is disclosed in U.S. Pat. No. 4,887,121, and is illustrated in FIG. 16. The sensor 91 faces the same direction as the lens opening 93 of the taking lens unit 60 of the camera 10, that is, the sensor 91 receives light through a window 95 directed toward the scene image to be captured by the taking lens unit 60. Ambient light enters the window 95 and is directed by a first light pipe 97 to a liquid crystal mask 99. A second light pipe 101 receives light transmitted through the liquid crystal mask 99 and directs that light to a series of differently colored filters 113 (preferably red, green, and blue). A photodetector 115 located on the other side of each of the filters 113 feeds a driver 119 that is connected to the control system 117 (controller, processor and other components). The liquid crystal mask 99 is controlled by the control system 117 to transmit light uniformly to all of the photodetectors 115 for color measurement. The liquid crystal mask 99 provides a grid (not illustrated) that can be partially blocked in different manners to provide exposure measurements in different patterns.

The electronic capture unit 16 can be used instead of a separate sensor, to obtain scene brightness and color balance values. In this approach, captured electronic image data is sampled and scene parameters are determined from that data. If autoexposure functions, such as automatic setting of shutter speeds and diaphragm settings, are to be used during that image capture, the electronic capture unit needs to obtain an ambient illumination level prior to an image capture. This can be done by providing an evaluate mode and a capture mode for the electronic capture unit as discussed elsewhere herein.

One or more information displays 98 can be provided on the body 12, in addition to the image display 24, to present camera information to the photographer, such as exposures remaining, battery state, printing format (such as C, H, or P), flash state, and the like. This information can also be provided on the image display 24 as a superimposition on the image or alternately instead of the image.

The camera 10 has user controls including "zoom in" and "zoom out" buttons 94 that control the zooming the lens unit or units, and a shutter release 18. The shutter release 18 or shutter button is connected to both shutters 72,74. To take a picture, the shutter release 18 is actuated by the user and trips from a set state to an intermediate state, and then to a released state. The shutter release 18 is typically actuated by pushing, and, for convenience the shutter release 18 is generally described herein as moving through a "first stroke" from the set state to the intermediate state and through a "second stroke" from the intermediate state to the released state. The use of a two stroke shutter release 18 is well known in the art and the first stroke can actuate autofocus and autoexposure systems in the same manner as other cameras 10. For example, the taking lens unit can autofocus to a detected subject distance and the apertures and shutter speeds can be set for detected exposure conditions.

In an embodiment of the camera 10, the electronic capture system has an evaluate mode and a capture mode. The evaluate mode captures an image during the first stroke and uses that image to set exposure parameters. The evaluate mode images from the CCD are processed by an image evaluator of the controller 82 to provide exposure parameters that are used in automatic exposure operations. The electronic image captured in the evaluate mode can be shown on the display 24 in the same manner as the verification image, but this is not currently preferred, since battery drain would be increased. Alternatively, exposure parameters are determined from an evaluation of exposure data provided by a separate ambient sensor (not shown) rather than evaluate mode images. In both cases, the camera 10 obtains the scene brightness (Bv) from components that can be categorized as a light meter. The camera 10 also obtains subject distance data from the autoranging unit (identified as "ranger" in FIG. 13), determines what focal length the zoom lens is set at using data from the zoom driver or a sensor (not shown). The camera 10 also detects the film cartridge and senses what film speed is loaded into the camera 10 using the film unit presence detector 96. The data is sent to the controller 82. In the controller 82, a firmware algorithm determines adjustment of focus and exposure parameters and signals the respective drivers to make required adjustments. This includes setting the exposure times for the imager 22 and film frame, the gain setting for the amplification of the imager analog signal, and the f-number of the variable apertures. The image evaluator also determines whether the flash unit should be enabled and, as appropriate, also determines when to quench the flash for the film frame exposure and when to close the imager 22 shutter for the imager 22 exposure.

The shutter release 18 or shutter button 26 is connected to both shutters 72,74. To take a picture, the shutter release 18 is actuated by the user and trips from a set state to an intermediate state, and then to a released state. The shutter release 18 is typically actuated by pushing, and, for convenience the shutter release 18 is generally described herein as moving through a "first stroke" from the set state to the intermediate state and through a "second stroke" from the intermediate state to the released state.

Figure 2:
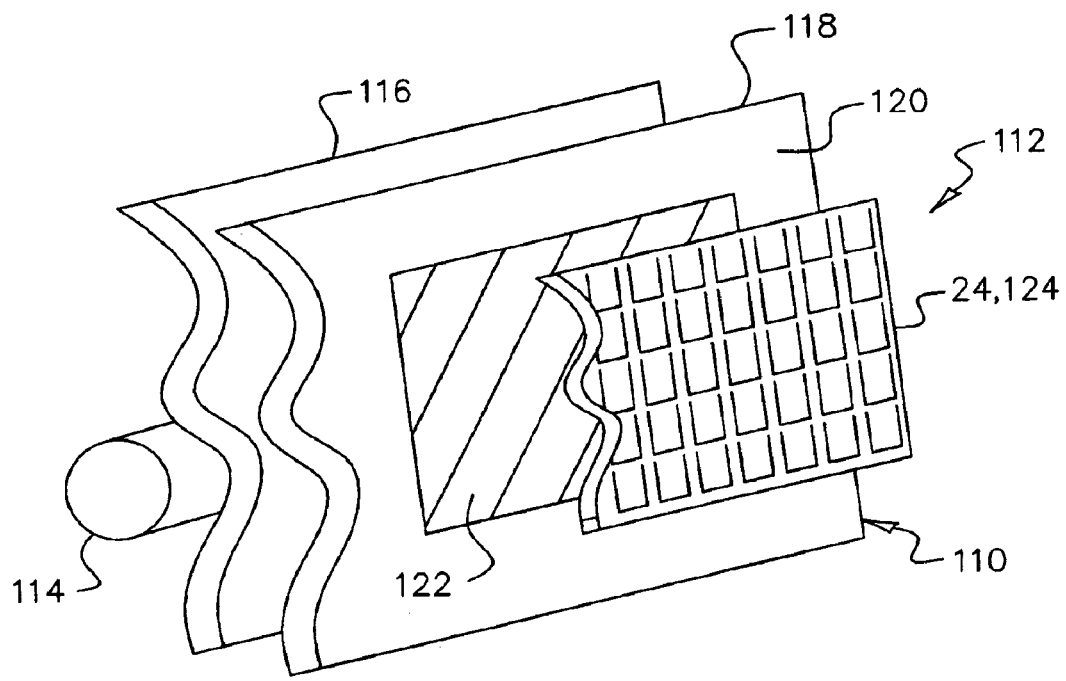
FIG. 2 is an exploded, partial perspective view of the combined display unit of the camera of FIG. 1.

A first switch 100 actuates when the shutter release 18 is pushed to the first stroke. When the first switch 100 actuates, exposure-delimiting camera components are operated. A wide variety of suitable components to provide these functions are well known to those of skill in the art. For example, as shown in FIG. 2, when the photographer pushes the shutter release 18 as a preparation for taking a photograph, the first stroke turns on the first switch 100, and in response, an exposure meter (not separately illustrated) has an exposure sensor that measures a brightness value (Bv) outputs the value to the controller 82. The controller 82 uses such values to calculate exposure parameters for the film exposure and, directly or indirectly, the shutter time or times for the electronic exposure of the imager 22. In addition to setting parameters for the shutters 72,74, the controller 82 can also change the aperture for one or both of the film paths. The flash unit 34 can likewise be energized and actuated as needed. Suitable components and programming for these purposes are well known to those of skill in the art. Parameters considered include relative differences in the speed of the film and the speed of the imager 22, differences in optical paths, and the like.

The use of a two "stroke" shutter release 18 is well known in the art and the first switch 100 in the camera 10 can actuate functions provided in other cameras 10 in a similar manner. For example, the optical system 50 or taking lens unit 72 can autofocus to a detected focused distance.

A second switch 102 actuates when the shutter release 18 is further pushed to a second stroke. When the second switch 102 actuates, the film shutter 72 is tripped and the capture of the latent image exposure on the film frame begins. The film shutter 72 momentarily opens. The imager shutter 74 is actuated concurrently with the film shutter.

Figure 5:
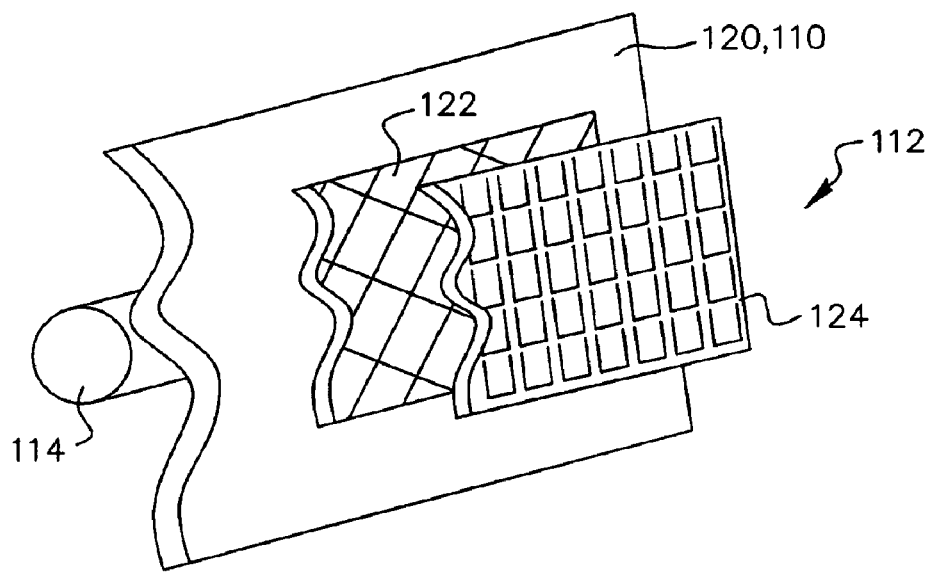
FIG. 5 shows another modified combined display unit in the same view as FIG. 2.
Figure 6:
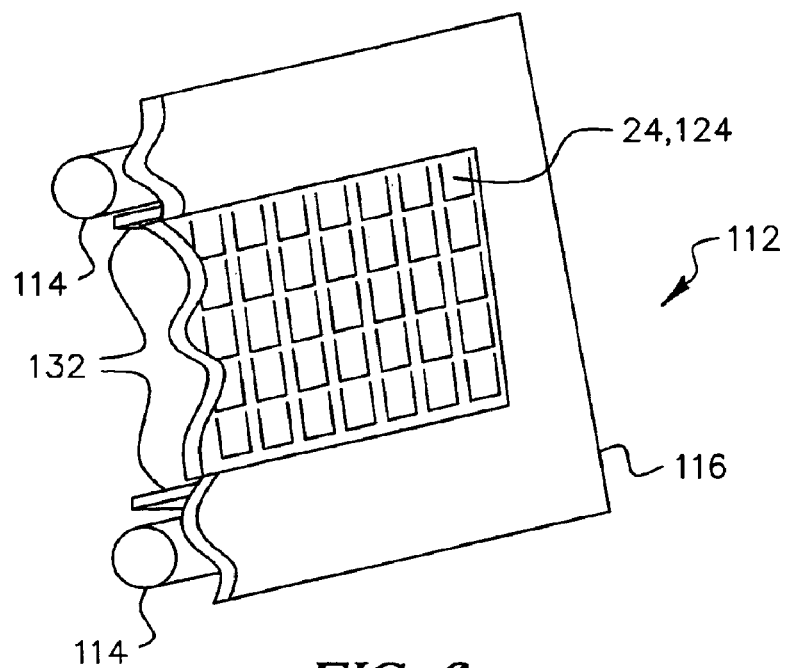
FIG. 6 shows a partial perspective view of another modified combined display unit.

The image display 24 is mounted on the back or top of the body 12, so as to be readily viewable by the photographer immediately following a picture taking. The image display 24 is shown in FIGS. 5–6 mounted to the back of the body 12. It is preferred that the image display 24 is operated on demand by actuation of a switch and that the image display 24 is turned off by a timer or by initial depression of the shutter release 18.

It is preferred that the imager 22 captures and the image display 24 shows substantially the same geometric extent of the subject image as the latent image, since the photographer can verify only what is shown in the display 24. For this reason it is preferred that the display 24 show from 85–100 percent of the latent image, or more preferably from 95–100 percent of the latent image.

An information display 104 (shown in FIGS. 12–13) can be mounted to the body 12 adjacent the image display 24 so that the two displays can be viewed by the photographer in a single glance. The information display 104 presents camera information to the photographer, such as exposures remaining, battery state, printing format (such as C, H, or P), flash state, and the like. This information can also be provided on the image display 24 as a superimposition on the image or alternately instead of the image.

The type of image display 24 used is not critical. For example, the image display 24 can be a liquid crystal display 24, a cathode ray tube display 24, or an organic electroluminescent display, "OELD" (also referred to as an organic light emitting display 24, "OLED"). Displays having low power requirements are preferred.

The camera 10 has a white-compensator 110 located on the outside of the body 12 adjoining the image display 24. The white-compensator 110 neighbors, or more preferably, circumscribes the image display 24. The neutral light from the white-compensator 110 has a color temperature that is preset to provide a standard. In ordinary use, it is convenient if the standard is daylight, or as close an approximation of daylight as is practical. The color temperature of the neutral light provided by the white-compensator 110 is independent of the color temperature of the verification image or the ambient illumination.

Figure 9:
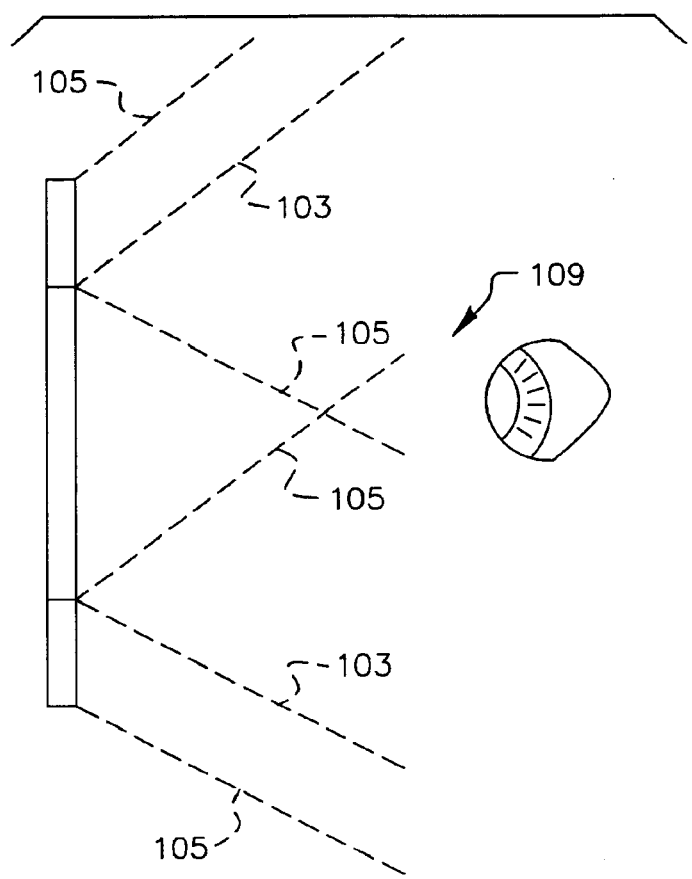
FIG. 9 is a semi-diagrammatical view illustrating the use of the image display. The combined display unit of FIG. 2 is shown in cross-section. Lines with small dashes delimit a light image viewing zone. Lines with large dashes delimit neutral light illumination zones.

In use, the camera 10 captures an electronic image and then displays the image on the image display 24, while at the same time the white-compensator 110 propagates neutral light outward from the body 12 in the same direction as a display 24 image propagated by the image display 24. The neutral light counteracts the ambient illumination. This is illustrated in FIG. 9. The display 24 of FIG. 2 is shown in cross-section. Lines with small dashes 103 delimit light emitted by the image display 24. Lines with large dashes delimit white-compensator light 105. An expected position of the user's eye or eyes (also referred to as a "light image viewing zone 109") has an overlap of the image display light 103 and neutral light 105 from the white-compensator 110. FIG. 9 also makes apparent that a circumscribing white-compensator 110 provides better coverage of the light image viewing zone 109, than does a white-compensator of another shape.

It is preferred that the white-compensator 110 is at least as bright as the image display 24, so that the image display 24 does not wash out the illumination provided by the white-compensator 110. Depending upon the relative brightness of the display 24 and white-compensator 110, ambient lighting conditions, the position of the camera 10 relative to the viewer, and the like, the counteracting provided by the white-compensator 110 can be complete or incomplete. With complete counteracting, the photographer visually adapts to the neutral light of the white-compensator 110. The hue and intensity of any color cast in the displayed image is directly apparent. Since color adaptation of the two eyes is approximately independent (see R. W. G. Hunt, *The Reproduction of Colour*, 4th. ed., Fountain Press, Tolworth, England, 1987, page 124); for complete counteracting in some cases, the user may have to shut one eye. With incomplete counteracting, the photographer visually adapts to a combination of the white-compensator 110 and ambient illumination. In this case, the absolute color cast in a displayed image may be less apparent, but the chroma, that is, the relative colorfulness of the displayed image relative to the white-compensator 110 remains very apparent.

The white-compensator 110 can be part of a combined display component 112 that also includes the image display 24 or, alternatively, the white-compensator 110 and image display 24 can be discrete components. Other related components, can also be shared or discrete.

Referring now to FIGS. 1–6, in particular embodiments, the camera 10 has a user interface 106 on the rear and top of the camera body 12. The user interface 106 includes the shutter release 18, zoom in and zoom out buttons (illustrated in combination as a rocker switch), a mode switch 108, and other controls 107. The mode switch can be used to selectively provide optional functions. The user interface 106 also includes an information display 98. Adjoining the user interface 106 is the eyepiece 58 of the viewfinder. Between the eyepiece 58 and the information display 98 is a combined display component 112. The combined display component 112 includes a white-compensator 110 that surrounds an image display 24.

The detailed features of the combined display component 112 can vary. FIGS. 2–6 illustrate some constructions. FIG. 2 shows a combined display component 112 that has a backlight 114, such as a fluorescent lamp, covered by a diffuser 116 and then a mask 118. The mask has a light transmissive outer region 120 and a inner region 122 that is a neutral density filter. A non-emissive pixellated display 124, such as an LCD, overlies the opaque inner region 122. The backlight 114 provides a white light output, and, together with the diffuser 116 and outer region 120 of the mask 118 forms the white-compensator 110. As a result of the neutral density filter, the white-compensator 110 is brighter than the image display 24.

Figure 3:
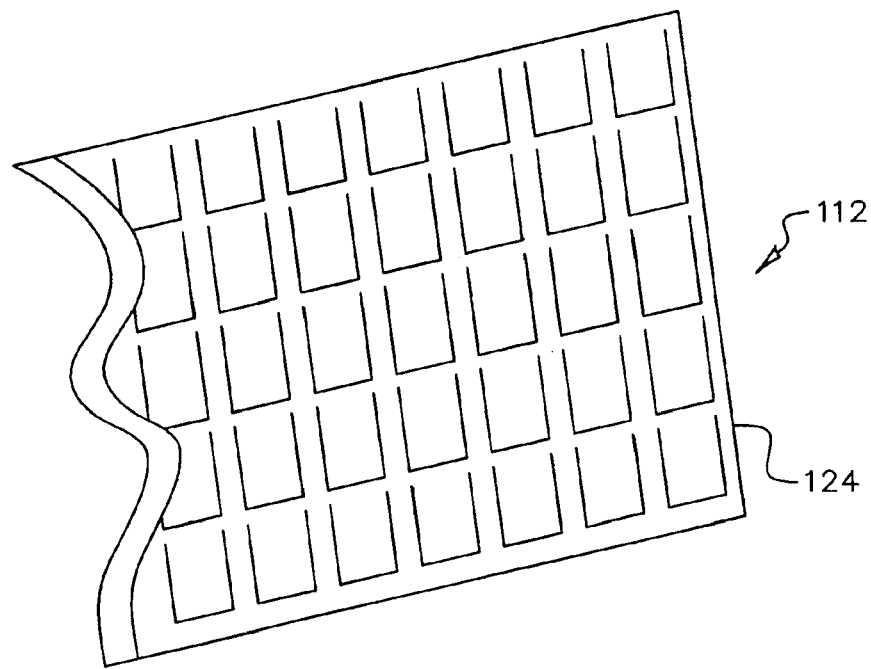
FIG. 3 shows a modified combined display unit in the same view as FIG. 2.
Figure 14:
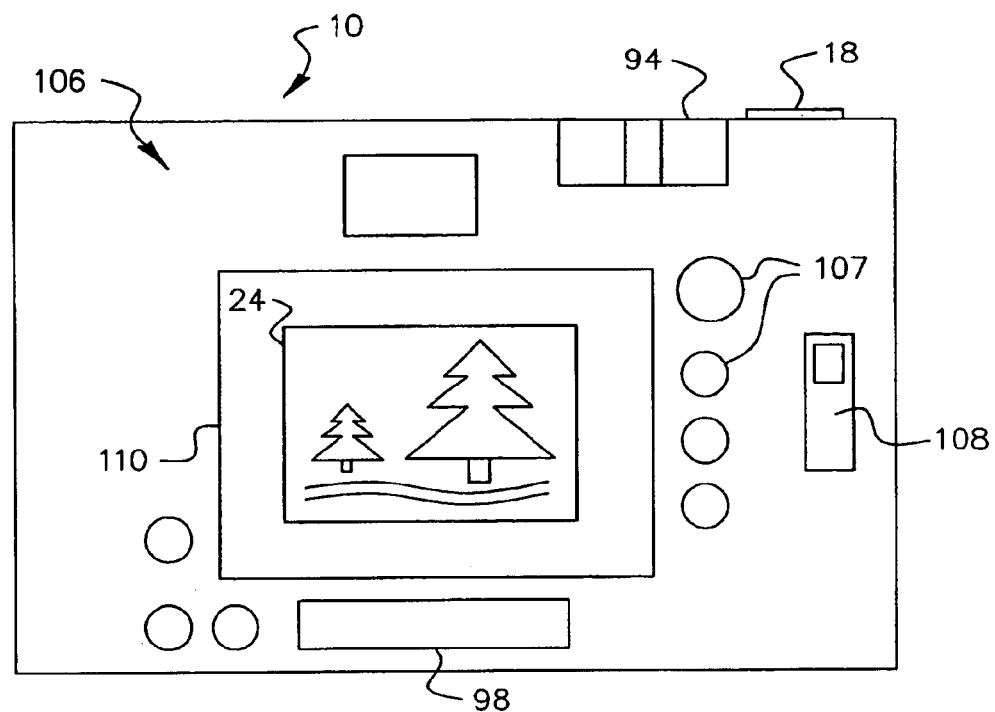
FIG. 14 is a rear view of the camera of FIG. 1 in one display mode.
Figure 15:
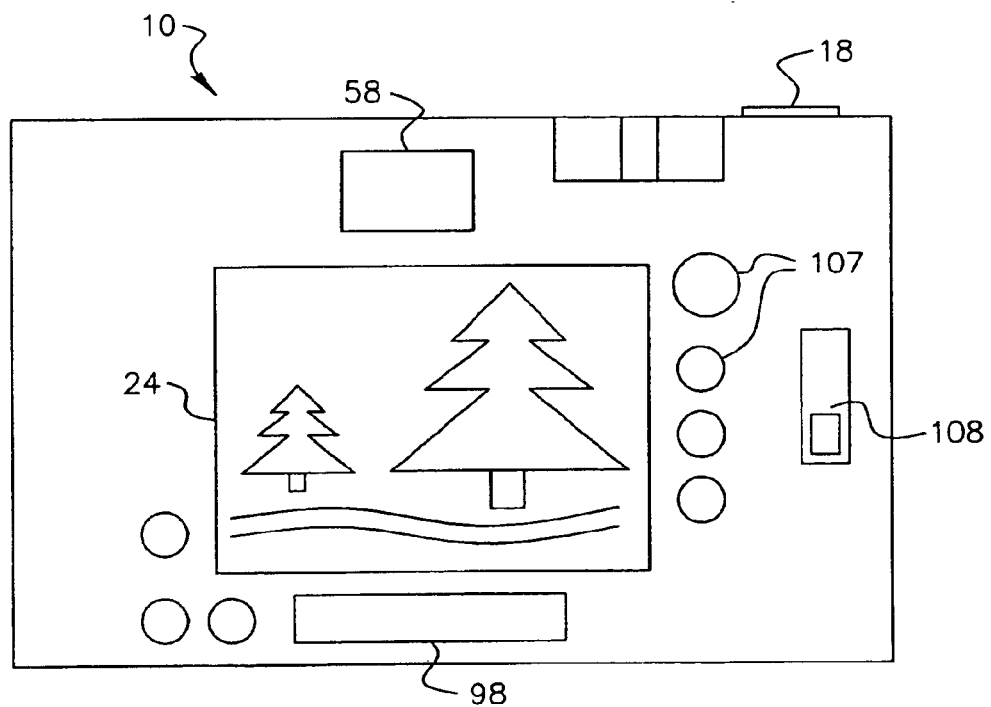
FIG. 15 is the same view as FIG. 14, but the camera is shown in a second display mode.

The combined display component 112 of FIG. 3 is a single emissive pixellated display 126, such as an OLED. In this case, the white-compensator 110 and image display 24 are defined by software and are each portions of the same display 126. It is preferred that the white-compensator 110 surrounds the image display 24 as shown in FIG. 1. FIGS. 14–15 show an embodiment in which the combined display component 112 is a single emissive pixellated display 124 and the mode switch is selectively switchable between a compensated mode (shown in FIG. 14) in which the white-compensator 110 surrounds the image display 24 and an uncompensated mode (shown in FIG. 15) in which the border and center of the combined display component 112 transmit a common, pixellated image from said electronic image capture unit. In the compensated mode, the white-compensator 110 (the outer border of the combined display 112) emits neutral light at the predetermined color temperature for the white-compensator and the displayed image (the center of the combined display 112) has a color temperature that is independent of the color temperature of the white-compensator. In the uncompensated mode, the color temperature of the displayed image is the same throughout the image. The mode switch 108 can be switched to momentarily eliminate the white-compensator 110 and use the entire combined display component 112 for the image display 24. For example, this can be done when the user desires to see details of the verification image.

Figure 4:
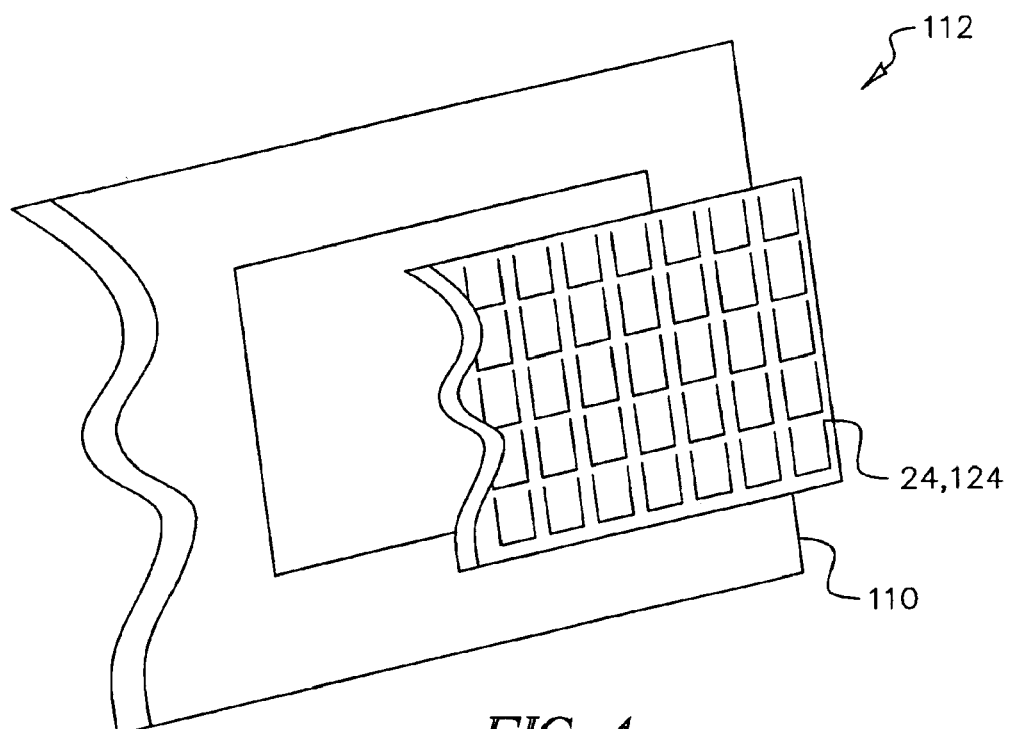
FIG. 4 shows another modified combined display unit in the same view as FIG. 2.

FIG. 4 shows a combined display component 112 that has a first pixellated emissive display that forms the image display 24 and a second non-pixellated display that forms the white-compensator 110.

FIG. 5 shows a combined display component 112 that has an overlying plate 128 having an outer region 120 that acts as a diffuser 116 and an opaque inner region 122. An emissive pixellated display 124, such as an OLED, overlies the opaque inner region 122.

Figure 10:
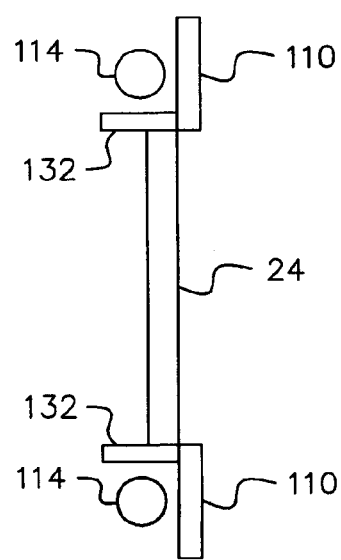
FIG. 10 is a cross-sectional view of the combined display unit of FIG. 6.
Figure 11:
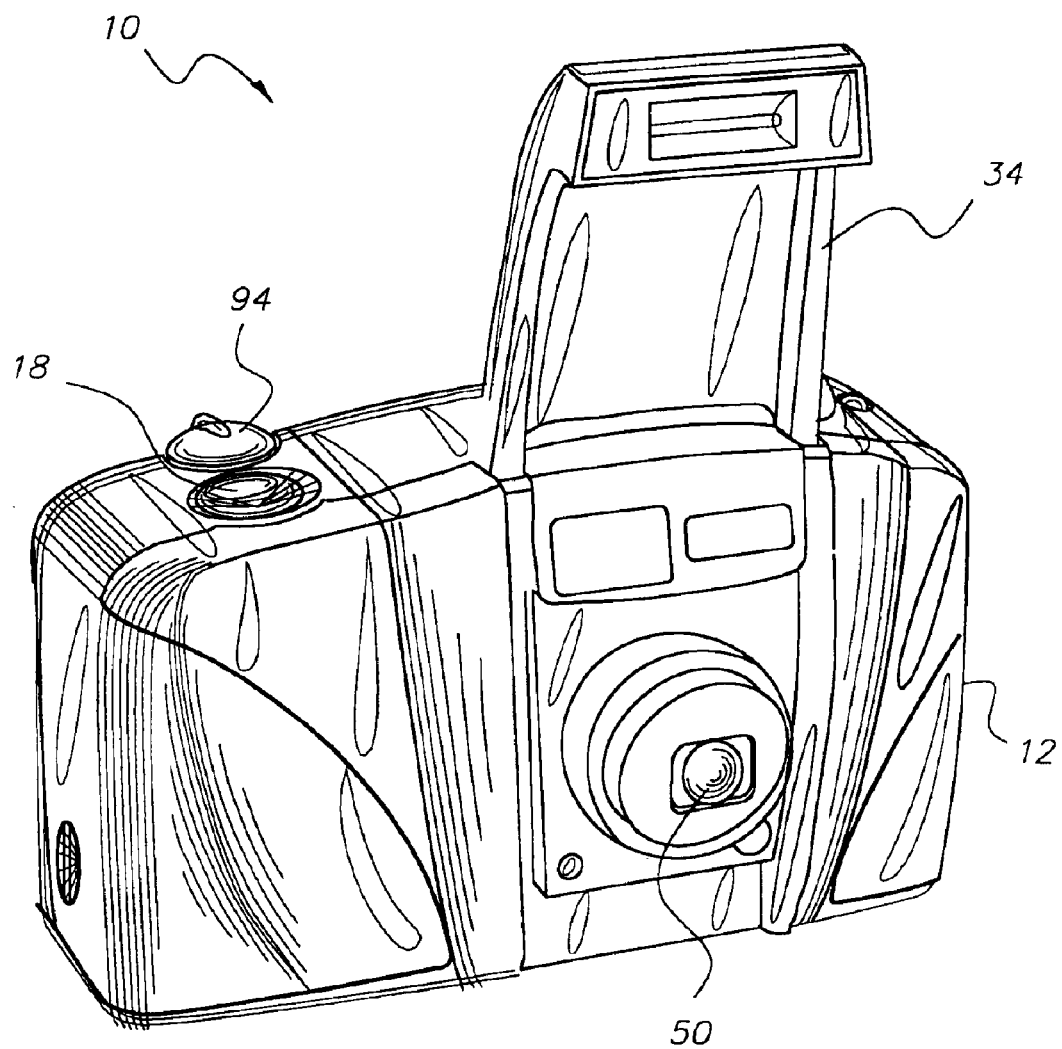
FIG. 11 is a front perspective view of another embodiment of the camera.
Figure 12:
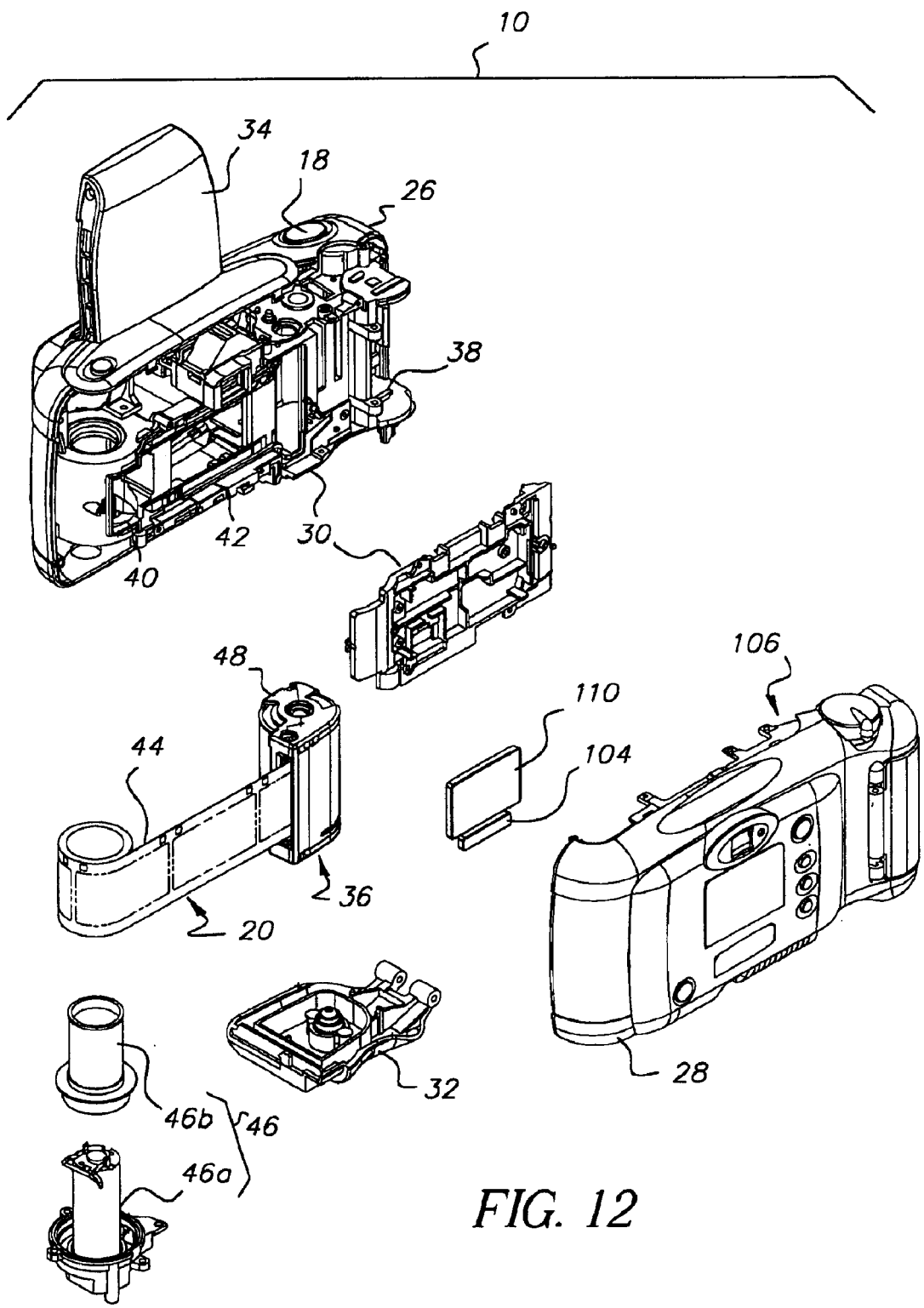
FIG. 12 is a rear perspective view of another embodiment of the camera, which differs from the camera of FIG. 11 in body shape.

FIGS. 6 and 10 show a combined display component 112 that has multiple backlights 114, each overlying a side of an open-centered diffuser 116. An emissive pixellated display 126 occupies the center of the diffuser 116. Flanges 132 shield the emissive display from the backlights 114. In this case, the image display is inset relative to the white-compensator 110 to reduce flare on the surface of the image display 24.

Figure 7:
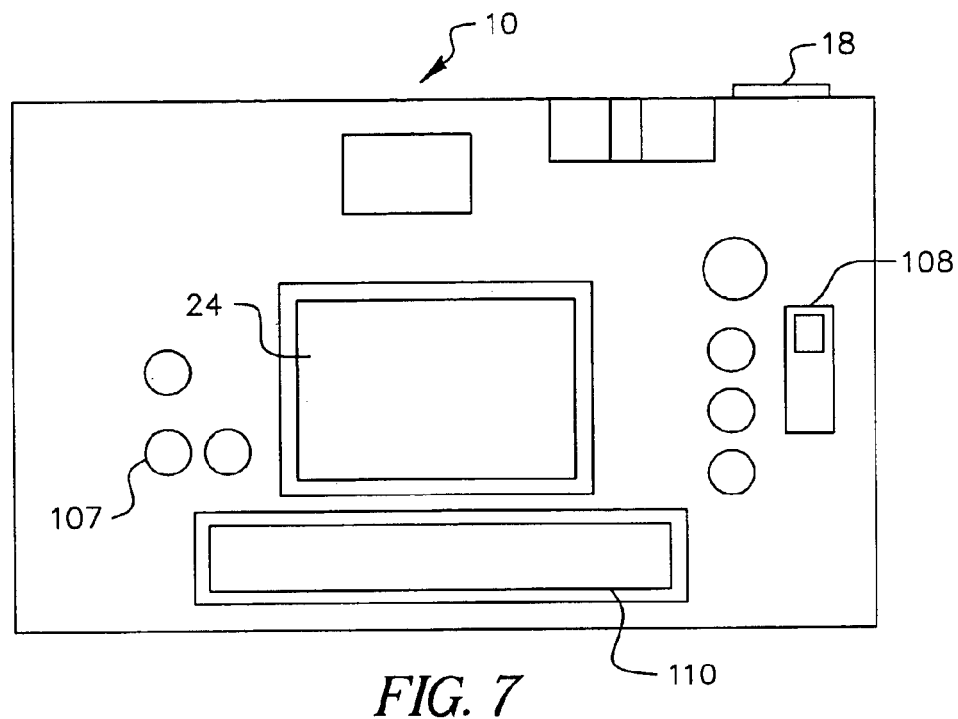
FIG. 7 is the same view as FIG. 1 of another embodiment of the camera.
Figure 8:
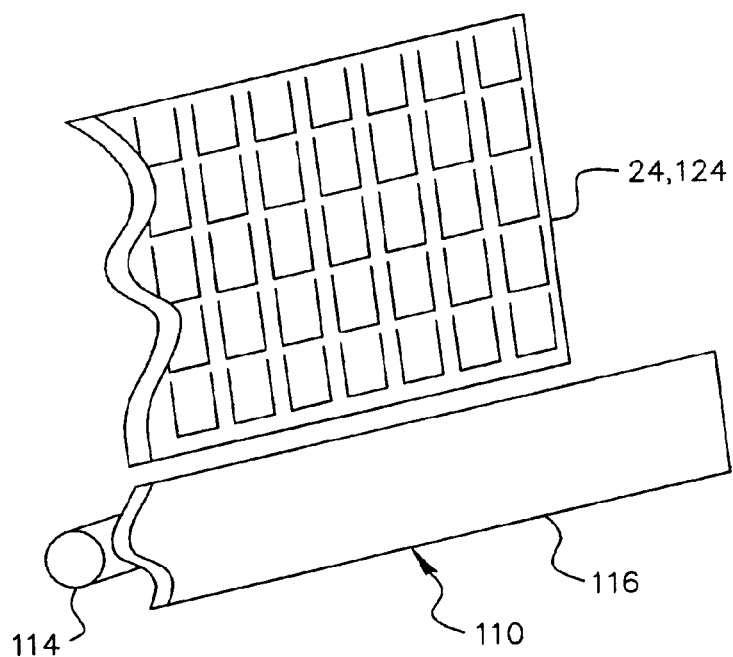
FIG. 8 is an exploded, partial perspective view of the image display and white-compensator of the camera of FIG. 7.

Referring now to FIGS. 7–8, in another embodiment, the white-compensator 110 is separate from an image display and is adjacent only to the lower part of the image display instead of surrounding the image display 24. The white compensator 110 shown has a diffuser 116 overlying a backlight 114. The image display 24 is a pixellated emissive display.

The invention has been described in detail with particular reference to certain preferred embodiments thereof, but it will be understood that variations and modifications can be effected within the spirit and scope of the invention.

What is claimed is:

1. A camera comprising:
    a body;
    an electronic imager disposed in said body, said imager generating an electronic image responsive to an incident light image;
    an image display disposed on the outside of said body, said image display being operatively connected to said electronic imager and emitting non-shielded display light to show said electronic image;
    a white-compensator propagating non-diffused neutral light at a preset color temperature independent of a color temperature of said electronic image to counteract ambient illumination when viewing said electronic image, said white-compensator positioned relative to said image display so that an overlap of said non-shielded display light and said non-diffused neutral light occurs.

2. The camera of claim 1, wherein said said preset color temperature is preset to provide an approximation of daylight.

3. The camera of claim 1, wherein said white-compensator is at least as bright as said image display so that said electronic image does not wash out illumination provided by said white-compensator.

4. The camera of claim 1, wherein said image display defines a light image viewing zone extending outward from said body to have said overlap of said non-shielded display light from said image display and said non-diffused neutral light from said white-compensator.

5. The camera of claim 1, wherein said image display is inset sufficiently relative to said white-compensator to reduce flare on said image display.

6. The camera of claim 1, wherein said image display and said white-compensator are combined to each be portions of the same combined display and include a backlight providing a white light output.

7. The camera of claim 6, further comprising a neutral density filter disposed between said backlight and said image display, but not between said backlight and said white-compensator, so that said white-compensator is brighter than said image display in said combined display.

8. The camera of claim 6, wherein said same combined display is a single emissive pixilated display.

9. The camera of claim 1, wherein said image display and said white compensator are a combined display component that is a single emissive pixilated display.

10. The camera of claim 1, further comprising an archival capture unit and an optical system directing a light image to said electronic imager and to said archival capture unit and wherein said archival capture unit has capture media having a designated illuminant and said camera includes a processor color balancing said electronic image to calibrate said image display for said capture media, but not white-balancing said electronic image.

11. A camera comprising:

an electronic image capture unit;

a panel with a compensated mode wherein a border of said panel transmits neutral light at a preset first color temperature and a center of said panel transmits a pixellated colored image from said electronic image capture unit at a second color temperature Independent of said first color temperature, said panel having an uncompensated mode wherein said border and center transmit a common, pixellated image from said electronic image capture unit at a single color temperature.

12. The camera of claim 11, further comprising an switch operatively connected to said panel, said switch being selectively actuable to change said panel between said modes.

13. The camera of claim 11, wherein said border circumscribes said center and is at least as bright as said center so that said colored, image from said center does not wash out said neutral light from said border.

14. The camera of claim 11, wherein said neutral light transmitted by said border of said panel is non-diffused.

15. An image capture method comprising the steps of:

capturing a light image as an electronic image, in a camera, under ambient lighting having a color cast;

converting said electronic image to a viewable display image;

propagating said display image with non-shielded display light outward from said camera in said ambient lighting; and counteracting said ambient lighting, when propagating said display image, with non-diffused white illumination in said ambient lighting, said counteracting step including providing an overlap of said non-shielded display light and said non-diffused white illumination.

16. The method of claim 15, wherein said non-diffused white illumination is at least as bright as said non-shielded display light.

17. An image capture method comprising the steps of:

capturing a light image as an electronic image, in a camera, under ambient lighting having a color cast;

converting said electronic image to a viewable display image; and propagating said display image outward from said camera in said ambient lighting; and counteracting said ambient lighting in the neighborhood of said propagating display image with white illumination, wherein said propagating and counteracting steps are selectively alternated.

* * * * *